(No Model.)
J. DEMAREST.
GREASE TRAP.
No. 436,124. Patented Sept. 9, 1890.
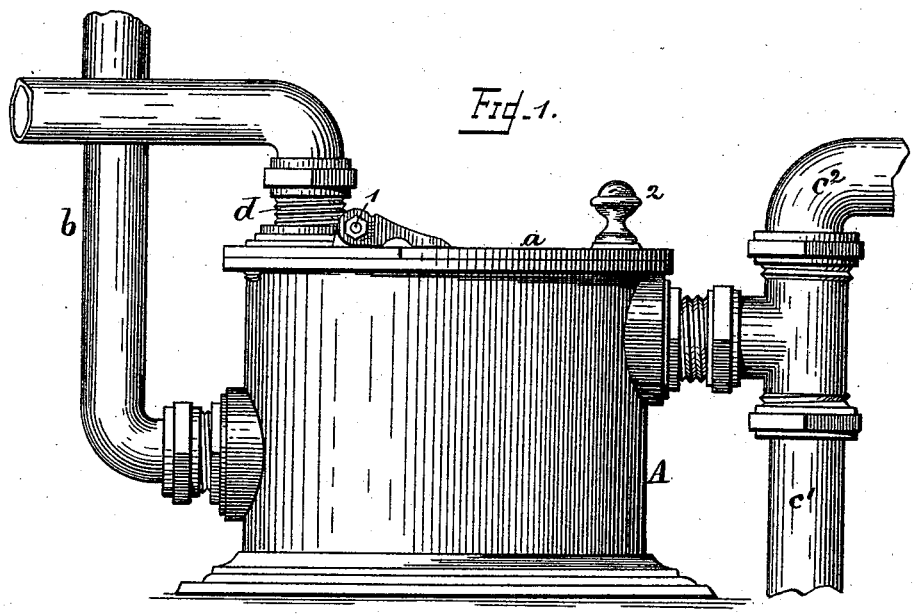
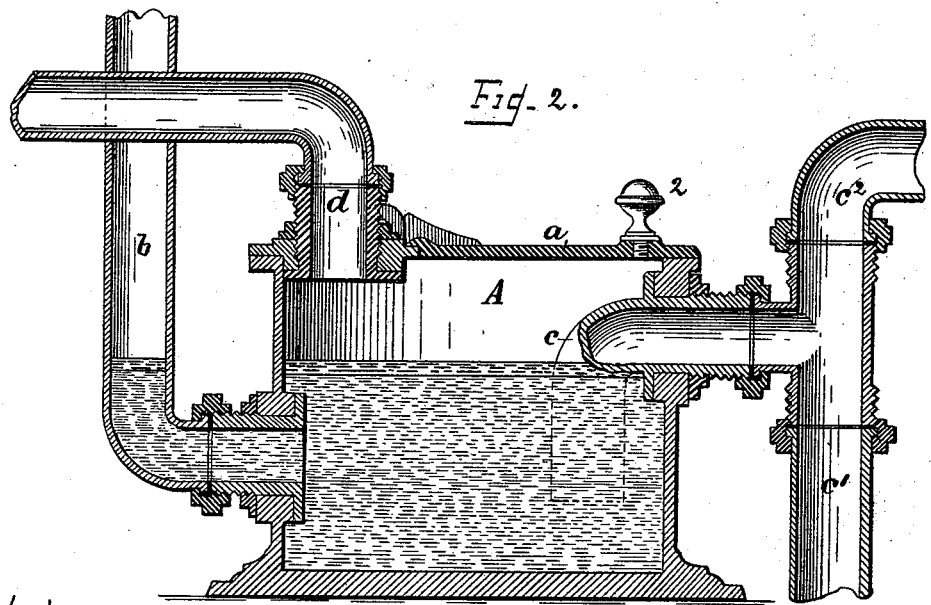
WITNESSES:
INVENTOR:
John Demarest
per Lemuel W. Serrell
Atty.

UNITED STATES PATENT OFFICE.

JOHN DEMAREST, OF NEW YORK, N. Y., ASSIGNOR TO THE J. L. MOTT IRON WORKS, OF SAME PLACE.

GREASE-TRAP.

SPECIFICATION forming part of Letters Patent No. 436,124, dated September 9, 1890.

Application filed July 9, 1888. Serial No. 279,390. (No model.)

*To all whom it may concern:*

Be it known that I, JOHN DEMAREST, of the city, county, and State of New York, have invented an Improvement in Grease-Traps; and the following is declared to be a description of the same.

My invention relates to an improved grease-trap, wherein I combine ventilating features and easy access to the trap for cleaning out the same and removing the grease, and in carrying out my invention I employ a metal vessel, preferably porcelain-lined, and having a hinged lid, and connected with which are supply and discharge pipes and ventilating-pipes, the supply-pipe passing in at the lower portion of the vessel and the discharge-pipe passing from within the vessel near its lower portion up and out of the vessel near the top of the same and forming the trap.

In the drawings, Figure 1 is an elevation of my improved grease-trap, and Fig. 2 is a vertical section through the same.

A is a metal vessel forming the grease-trap, and I prefer to construct the same circular, so that there are no angles around the sides for the lodgment of grease or other matter, and I prefer to line said metal vessel with porcelain glaze, because the same is cleanly in appearance and more easily cleaned and kept clean than the metal itself, and in the upper part of said vessel I provide a two-part cover $a$, one part of which is hinged at 1 and provided with a lifting-knob at 2, and said portion covers about two-thirds of the surface of the top of the vessel, and may, if desired, be provided with a rubber packing or seat.

$b$ is the supply-pipe descending from a sink or sink-trap, and said pipe enters the vessel A at its lower portion, and is coupled thereto in any usual manner. The discharge-pipe $c$ passes through the upper part of the metal vessel A, and is also coupled thereto in the usual manner, and said discharge-pipe has a downwardly-projecting elbow into the metal vessel A, extending to near the bottom of the same, so as to form a trap; and $c'$ represents the sewer-pipe, from the upper end of which projects the ventilating sewer-pipe $c^2$, which passes to any desired medium for ventilating, and said pipes $c'$ $c^2$ are connected to the end of the discharge-pipe $c$, and there is a ventilating-pipe $d$, connected by suitable couplings and opening into the top of the vessel A, so as to convey away from said vessel any foul odor and discharge the same in any desired or usual manner where it will not be detrimental.

In Fig. 2 I have shown a vessel A and supply-pipe $b$ and the lower end of the discharge-pipe $c$ as filled with liquid, the upper portion of which, in darker dotted lines, represents the line of the grease, which grease will collect in said vessel upon the surface of the liquid and will not be discharged through the pipe $c$, but can readily be removed in any desired way upon raising the lid $a$, which will give access to the vessel.

My improved grease-trap and the pipes and fittings to the same are of such a character that they will comply with the present custom in plumbing where the pipes and parts are exposed to view, because the same is of agreeable external outline and is adapted to rest upon a floor or a support of any kind.

I claim as my invention—

The grease-trap composed of a circular porcelain-lined metal vessel A, a two-part cover having one part stationary and one part hinged, a ventilating-pipe $d$ for the vessel A, connected to and passing through the fixed part of the cover, an inlet-pipe $b$, entering the lower part of the vessel A, the discharge-pipe $c$ through the side of the vessel A and having a downwardly-projecting elbow within the vessel to form a trap, the descending sewer-pipe $c'$, connected to the discharge-pipe outside the vessel A, and the ascending ventilating-pipe $c^2$, connected to the sewer-pipe, substantially as specified.

Signed by me this 2d day of July, 1888.

JOHN DEMAREST.

Witnesses:
MAX GOEBEL,
WM. P. REID.